Aug. 24, 1937.　　　E. D. RAY ET AL　　　2,090,897

CHAIN FASTENER

Filed June 11, 1936

Inventors
E. D. RAY
J. A. STANTON

By H. B. Willson & Co.
Attorneys

Patented Aug. 24, 1937

2,090,897

UNITED STATES PATENT OFFICE 2,090,897

CHAIN FASTENER

Edgar D. Ray and James A. Stanton, Brush, Colo.

Application June 11, 1936, Serial No. 84,736

5 Claims. (Cl. 24—116)

This application is a continuation in part of our allowed United States application Serial No. 65,474, filed February 24, 1936.

The invention aims to provide a new and improved chain fastener which will aid materially in adjusting and fastening tow chains, hoisting chains, and the like without leaving a dangling chain end.

With the foregoing in view, the invention resides in the novel subject matter hereinafter described and claimed, description being accomplished by reference to the accompanying drawing.

Figure 1:
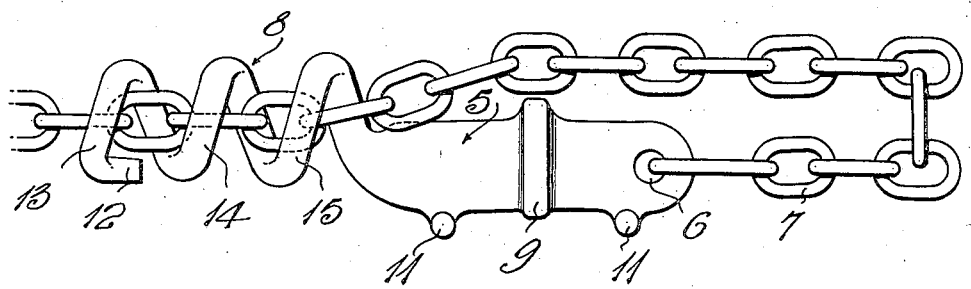
Fig. 1 is a side elevation illustrating one form of the fastener connected with a chain, showing the manner in which the looped guide on one end of the fastener may slide along the chain when adjusting chain and fastener relatively before fastening the one to the other.
Figure 2:
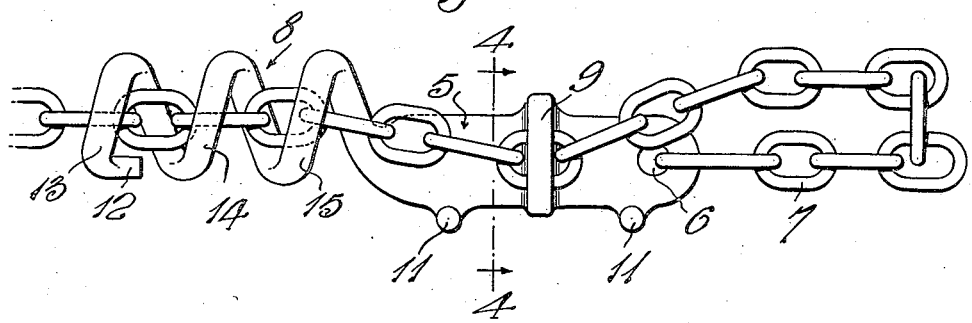
Fig. 2 is a view similar to Fig. 1 but showing the fastener and chain completely engaged with each other.
Figure 4:
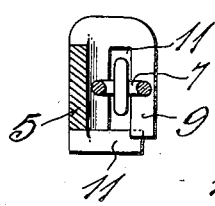
Fig. 4 is a transverse sectional view on line 4—4 of Fig. 2.
Figure 3:
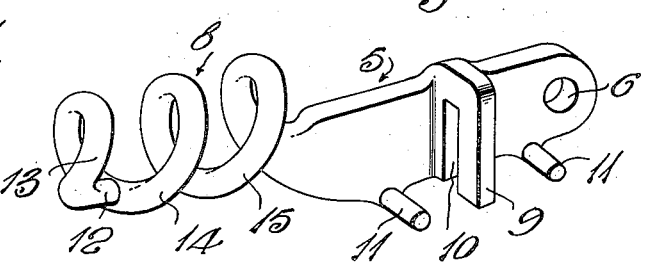
Fig. 3 is a perspective view showing the fastener of Figs. 1 and 2 disconnected from the chain.
Figure 5:
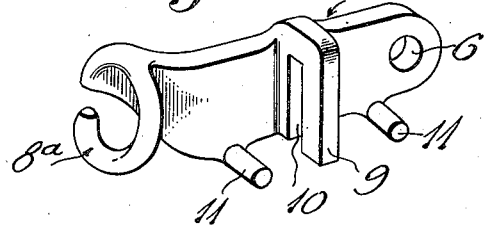
Fig. 5 is a perspective view showing a second form of the invention having a simplified looped guide.

A horizontally elongated metal body 5 is provided, said body having an opening 6 or other means at one of its ends for attachment of a chain 7. The opposite end of the body 5 is provided with an integral looped guide to receive the chain and slide thereon during relative adjustment of the chain and fastener, said guide being shown of helical form at 8 in Figs. 1, 2 and 3 and of open ring form at 8ª in Fig. 5, one end of the open ring 8ª being integrally joined to a nose-like portion of the body while the other end of said open ring is spaced downwardly from said nose-like portion to allow edgewise passage of a chain link into or from said open ring. Between its ends, the body 5 is provided with an angular chain-engaging finger 9 disposed transversely of said body, said finger being integrally joined at one of its ends to said body and having the major portion of its length laterally spaced from said body to allow edgewise insertion only of a link of the chain 7 between said body and said finger to hold the body and chain in relatively adjusted position. If desired, a rib 10 may be integrally formed on the body 5 in opposed relation with the inner side of the finger 9 to coact with the latter in engaging the chain.

Two lateral guard studs 11 are formed integrally with the body 5 and are disposed between the free end of the finger 9 and the ends of said body, the distance from either stud to said finger being only slightly more than the diameter of the chain 7. These studs are intended to abut the chain and prevent accidental sliding of the latter from engagement with the finger 7, and only when the chain is slack, can it be manually disengaged from said finger and studs.

The terminal 12 of the outermost convolution 13 of the helically coiled guide 8 is bent obtusely inward toward the next adjacent convolution 14 and into such close relation therewith as to allow only edgewise passage of any link of the chain between said terminal and said convolution 14, thus overcoming danger of the chain becoming accidentally disengaged from the guide. The chain is engaged with the guide by moving said chain sidewise into the innermost convolution 15 of said guide and by then circularly moving the chain about the guide, causing said chain to "thread" successively into the convolutions 14 and 13, it being necessary however, to turn the proper chain link edgewise before it can pass between the terminal 12 and the convolution 14.

After engaging the looped guide 8 or 8ª with the chain, said guide is free to slide longitudinally upon said chain until the latter has been connected in the desired way with the load and is to be securely held against further sliding with respect to the body 5. A link of the chain is then inserted edgewise between the rib 10 and the finger 9 and adjacent links of the chain are engaged with the studs 11, whereupon the fastened chain is in readiness for use. Obviously, to release the fastener, it is necessary to reverse the steps above described. When entirely removing the guide 8 from the chain, it is required that a link of the latter be turned edgewise before it can pass between the terminal 12 and the convolution 14. Similar positioning of a link is necessary before the chain can enter or leave the guide 8ª. By requiring such manipulation of the chain, it is insured that it shall not accidentally move from engagement with the guide.

It will be seen from the foregoing that a simple and inexpensive chain fastener has been provided, yet one which will be efficient and desirable from numerous standpoints. While the specific structure disclosed is preferably followed, attention is again invited to the possibility of making variations within the scope of the invention as claimed.

We claim:

1. A chain fastener comprising an elongated body having means at one end for attaching a chain thereto, the other end of said body being provided with an integral helically coiled guide to receive the chain and slide thereon during relative adjustment of the chain and fastener, said body being provided between its ends with an angular chain-engaging finger disposed transversely of said body, said finger being integrally joined at one of its ends to said body and having the major portion of its length laterally spaced from said body to allow edgewise insertion only of a link of the chain between said body and said finger to hold the body and chain in relatively adjusted position.

2. A chain fastener comprising an elongated body having means at one end for attaching a chain thereto, the other end of said body being provided with an integral helically coiled guide to receive the chain and slide thereon during relative adjustment of the chain and fastener, said body being provided between its ends with an angular chain-engaging finger disposed transversely of said body, said finger being integrally joined at one of its ends to said body and having the major portion of its length laterally spaced from said body to allow edgewise insertion only of a link of the chain between said body and said finger to hold the body and chain in relatively adjusted position, said body being provided with two lateral guard studs disposed between the free end of said finger and the ends of the body, said studs being positioned to abut the chain and prevent accidental sliding thereof from engagement with said finger.

3. A chain fastener comprising an elongated body having means at one end for attaching a chain thereto, the other end of said body being provided with an integral looped guide to receive the chain and slide thereon during relative adjustment of the chain and fastener, said body being provided between its ends with an angular chain-engaging finger disposed transversely of said body, said finger being integrally joined at one of its ends to said body and having the major portion of its length laterally spaced from said body to allow edgewise insertion only of a link of the chain between said body and said finger to hold the body and chain in relatively adjusted position, said body being provided with an integral transverse rib in opposed relation with the inner side of said finger to coact with the latter in holding the chain, said body being provided with two lateral guide studs disposed between the free end of said finger and the ends of the body, said studs being positioned to abut the chain and to prevent accidental sliding thereof from engagement with said finger.

4. A chain fastener comprising an elongated body having means at one end for attaching a chain thereto, the other end of said body being provided with an integral helically coiled guide to receive the chain and slide thereon during relative adjustment of the chain and fastener, said body being provided with means for fastening the chain thereto after adjustment, the terminal of the outermost convolution of said helically coiled guide being bent toward the next adjacent convolution and into such close relation therewith as to allow a link of the chain to pass edgewise only between said terminal and said next adjacent convolution, preventing accidental disengagement of the chain from the guide.

5. A chain fastener comprising an elongated body having means at one end for attaching a chain thereto, the other end of said body being provided with an integral longitudinally projecting nose at its upper portion and with an open ring in a plane at right angles to the length of the body to slidably surround the chain, one end of said open ring being integrally joined to said nose, the other end of said open ring being spaced downwardly from said nose to allow edgewise passage of the chain link into and from said open ring, said body being provided between its ends with an angular chain-engaging finger disposed transversely of said body, said finger being integrally joined at one of its ends to said body and having the major portion of its length laterally spaced from said body to allow edgewise insertion only of a link of the chain between said body and said finger to hold the body and chain in relatively adjusted position, said body being provided with two lateral guard studs disposed between the free end of said finger and the ends of the body, said studs being positioned to abut the chain and prevent accidental sliding thereof from engagement with said finger.

EDGAR D. RAY.
JAMES A. STANTON.